UNITED STATES PATENT OFFICE.

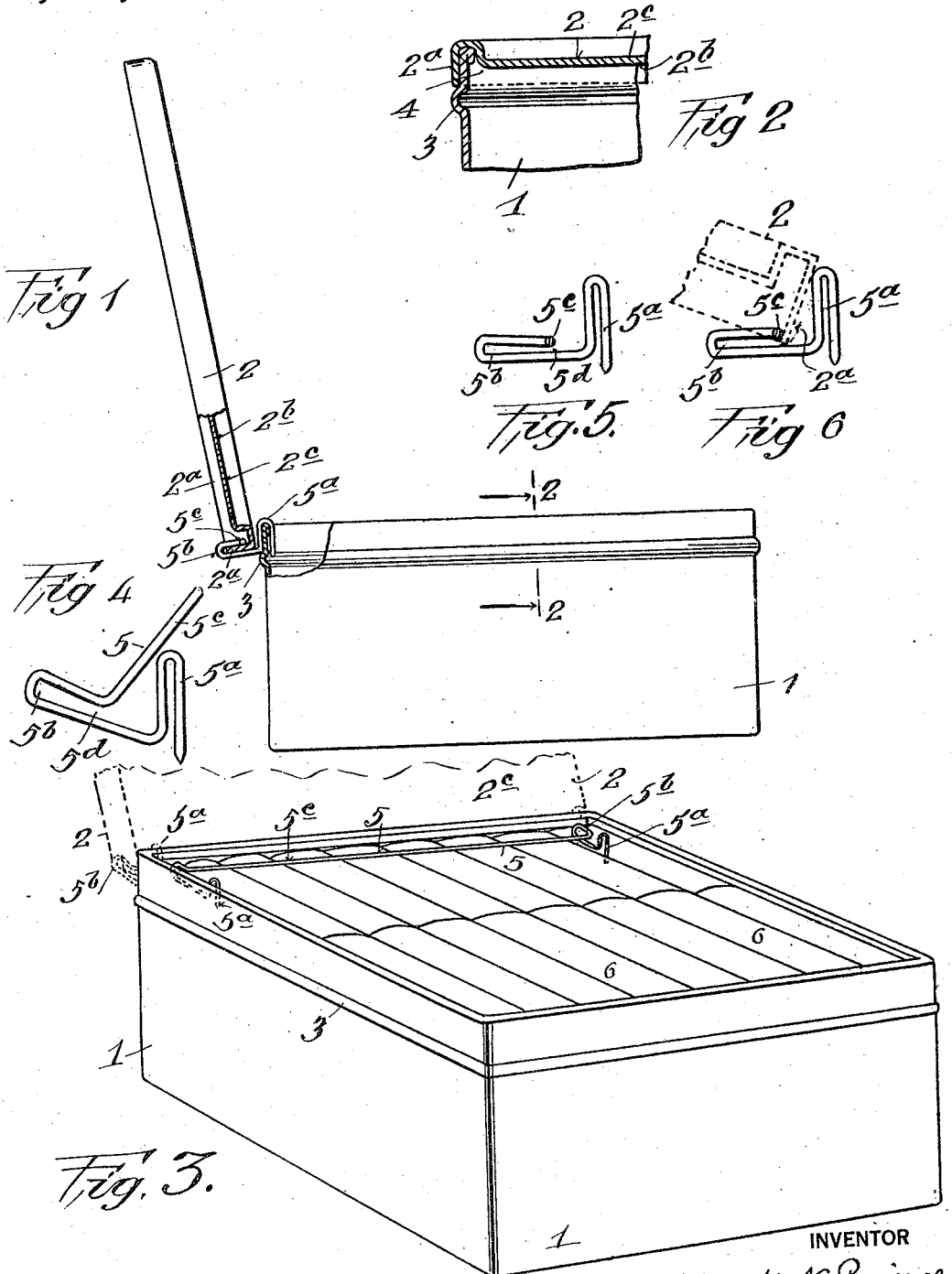

FRANK N. PRINCE, OF PASSAIC, NEW JERSEY, ASSIGNOR TO PASSAIC METAL WARE CO., OF PASSAIC, NEW JERSEY, A CORPORATION OF NEW JERSEY.

SUPPORT FOR BOX COVERS.

1,418,673.         Specification of Letters Patent.    Patented June 6, 1922.

Application filed April 1, 1921. Serial No. 457,668.

*To all whom it may concern:*

Be it known that I, FRANK N. PRINCE, a citizen of the United States, and resident of Passaic, in the county of Passaic and State of New Jersey, have invented certain new and useful Improvements in Supports for Box Covers, of which the following is a specification.

Boxes are frequently made to display the contents when the cover is opened and retained inclined from the box, such as boxes containing candies, cigars and the like. In such cases the inner surfaces of the covers are usually decorated or embellished to provide an attractive appearance and to advertise the wares, and the outer surfaces of the covers are also frequently decorated for the same purpose. Such decoration or embellishment of both the inner and outer surfaces of the box cover increases the cost of the box beyond the cost of decorating or embellishing one side only of the cover.

An object of my invention is to detachably retain a display or advertising member upon a box. A particular object is to detachably retain the box cover on the box in an exposed or upright position, whereby I am enabled to omit the decoration or embellishment on the inner surface of the cover and to utilize the decorated or embellished outer surface of the cover for desired display. I provide a support to fit on the box to retain the display member or cover on the box with its decorated surface exposed to front view behind the wares in the box, the undecorated inner surface of the member or cover being concealed rearwardly behind the box.

My invention comprises novel details of improvement that will be more fully hereinafter set forth and then pointed out in the claims.

Reference to be had to the accompanying drawings forming part hereof, wherein

Fig. 1 is a partly sectional side view of a box embodying my invention; Fig. 2 is an enlarged detail section on line 2, 2 in Fig. 1; Fig. 3 is a perspective view; Fig. 4 is a detail perspective of part of the cover support; Fig. 5 is a section of said support and Fig. 6 is a similar view illustrating the application of the cover to the support.

Similar numerals of reference indicate corresponding parts in the several views.

The box 1 may be of any suitable or usual construction and shape, such as of metal, cardboard or the like, the cover for the box being indicated at 2. In the example illustrated the box has a bead 3 extending around it near the open edge and the open edge portion 4 of the box is shown bent back providing a thickened smooth edge. The cover is shown provided with a marginal flange $2^a$ adapted to fit around the open portion of the box. The cover need not be hinged to the box to swing thereon but may be bodily detachable from the box to be lifted entirely therefrom. The main wall $2^b$ of the cover is shown depressed within the flange $2^a$ to fit within the box walls.

At 5 is indicated a support adapted to be detachably fitted to a side wall of the box to retain a display member in position. Said support is shown comprising hooklike members $5^a$ to receive and rest on the edge of the box wall and other seat-like members $5^b$, extending at an angle to the hooks laterally therefrom adapted to receive and retain a portion of the cover flange $2^a$, Fig. 1. The seat-like members $5^b$ are shown connected by a bar $5^c$ adapted to extend along the box side to retain the members $5^a$, $5^b$, in position. The said support may be made by means of a piece of wire having the intermediate spacing portion $5^c$ at the opposite ends of which the members $5^b$ and hooks $5^a$ are formed by suitably bending the wire. The hooks both extend in the same direction and the members $5^b$ extend outwardly with their open portions $5^d$ facing the hooks, the bar $5^c$ being between the hooks and the seats of the members $5^b$ with sufficient spacing to admit the cover flange. The support 5 is shown of the proper length and of such construction as to fit within the box for storage, as illustrated in Fig. 3.

The outer surface $2^c$ of the cover 2 may be decorated or embellished in any desired manner for display or advertising while the opposite or inner surface of the cover may be left unfinished. When the box is packed with the wares 6 the support 5 may be placed in the box, and the cover applied. When the cover is to be used as a display member it is removed bodily from the box and the support 5 is hung by its hooks $5^a$ upon the edge of the box with the seat-like members $5^b$ projecting outwardly. An appropriate portion of flange $2^a$ of the cover is then inserted in the seat-like members $5^b$, at one side of the box, the cover having been reversed so that its decorated top or outer surface 2ᶜ is displayed behind the wares 6, the cover extending in an upward direction, preferably inclining somewhat rearwardly, as shown in Fig. 1. The length of the support 5 may be such that the hooks fit near the adjacent end or side walls of the box to keep the support from sliding lengthwise. The members 5ᵇ preferably are so located respecting hooks 5ᵃ that when the flange 2ᵃ is applied to members 5ᵇ the cover will be much inclined respecting said members to bear against the hooks, so that the cover will have to be forced to snap or slide past the hooks, the parts of support 5 bending by resiliency to admit the flange in members 5, whereby the flange will be held snugly between the members and the hooks.

The decorated top of the cover will be displayed at reduced cost of manufacture, both when the cover is in place on the box and when held by support 5, since but one side or surface of the cover need be decorated. A further advantage is that no hinges are required to connect the cover to the box for display, whereby the cover may fit tightly on the box, thereby excluding air that would enter the box through spaces naturally incident to wire hinges frequently used with box covers, the support 5 being cheaper to manufacture than to hinge the cover on the box.

While I have referred to the support 5 as particularly adapted to retain the box cover in position on the box to serve as a display or advertising member, it will be understood that the support may be adapted to retain any other desired display or advertising member on the box, such as a sign or sheet made of metal, cardboard, or other suitable material, either with or without a flange at the edge, the bar 5ᶜ extending between the hooks 5ᵃ serving to retain such member in position between the bar and the box wall, the wire being suitably shaped for such purpose.

Having now described my invention, what I claim is:—

1. A support for a box cover comprising laterally disposed members having open inner portions adapted to detachably receive the flange of the cover provided with means to sustain said members upon the edge of the box.

2. A support for a box cover comprising a bar having laterally disposed members having open portions to receive the flange of the cover and supporting means for said members extending therefrom adapted to be detachably supported on the box.

3. A support for a box cover comprising a bar adapted to extend along a side of the box and provided with spaced laterally disposed members having open inner portions to receive the flange of the cover and hooks connected with said members extending at an angle thereto to be supported upon the edge of the box.

4. The combination of a box having a detachable cover provided with a flange, with a support comprising a bar separate from the cover having laterally disposed members having open portions to detachably receive the cover flange and means to detachably retain the support on the box.

Signed at Passaic, in the county of Passaic, and State of New Jersey, this 30 day of March, A. D. 1921.

FRANK N. PRINCE.